Jan. 5, 1932.  T. J. SMULSKI  1,839,933
WINDSHIELD CLEANING APPARATUS
Filed Feb. 17, 1927  6 Sheets-Sheet 1

Witness:
William P. Kilroy

Inventor:
Theodore J. Smulski
Hill & Hill
Attys.

Jan. 5, 1932.   T. J. SMULSKI   1,839,933
WINDSHIELD CLEANING APPARATUS
Filed Feb. 17, 1927   6 Sheets-Sheet 3

Inventor:
Theodore J. Smulski

Jan. 5, 1932.  T. J. SMULSKI  1,839,933
WINDSHIELD CLEANING APPARATUS
Filed Feb. 17, 1927   6 Sheets-Sheet 4

Inventor:
Theodore J. Smutski

Jan. 5, 1932.  T. J. SMULSKI  1,839,933
WINDSHIELD CLEANING APPARATUS
Filed Feb. 17, 1927  6 Sheets-Sheet 5

Witness:
William P. Kilroy

Inventor:
Theodore J. Smulski
Hill & Hill
Attys

Jan. 5, 1932. T. J. SMULSKI 1,839,933
WINDSHIELD CLEANING APPARATUS
Filed Feb. 17, 1927 6 Sheets-Sheet 6

Inventor
Theodore J. Smulski

Patented Jan. 5, 1932

1,839,933

UNITED STATES PATENT OFFICE

THEODORE J. SMULSKI, OF LAKE ZURICH, ILLINOIS, ASSIGNOR TO THE ANDERSON CO., OF GARY, INDIANA, A CORPORATION OF INDIANA

WINDSHIELD CLEANING APPARATUS

Application filed February 17, 1927. Serial No. 169,116.

My invention relates broadly to windshield cleaning apparatus and more particularly to electrically operated apparatus of the kind described.

A particular object of the invention is to provide apparatus of the kind described comprising improved means for controlling the speed at which it operates.

Another particular object of the invention is to provide improved means for translating reciprocatory motion into rotary motion.

Another particular object of the invention is to provide improved mechanism for automatically opening and closing an electrical circuit.

Still another object of the invention is to provide an improved housing for holding the actuating mechanism of apparatus of the kind described.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts.

The windshield cleaning apparatus shown in the accompanying drawings is of the type shown in my copending application, Serial No. 25,532 filed April 24, 1925.

Referring to the drawings, the reference character 20 designates generally a housing adapted to hold electro-magnetically operated mechanism for oscillating a squeegee 21 engageable with a windshield 22 having a frame member 23 upon which the housing is mounted. Any suitable means may be provided for securing the housing 20 to the frame member 23, but I prefer to provide a bracket member 25 rigidly secured to the housing 20 and formed with an aperture 26 in one of its ends, through which a screw 27 may be employed to secure the bracket to the frame member. In the other end of the bracket 25, I preferably provide a slot 30 which will accommodate a screw 31 whereby this end of the bracket is secured to the frame member 23.

Figure 5:
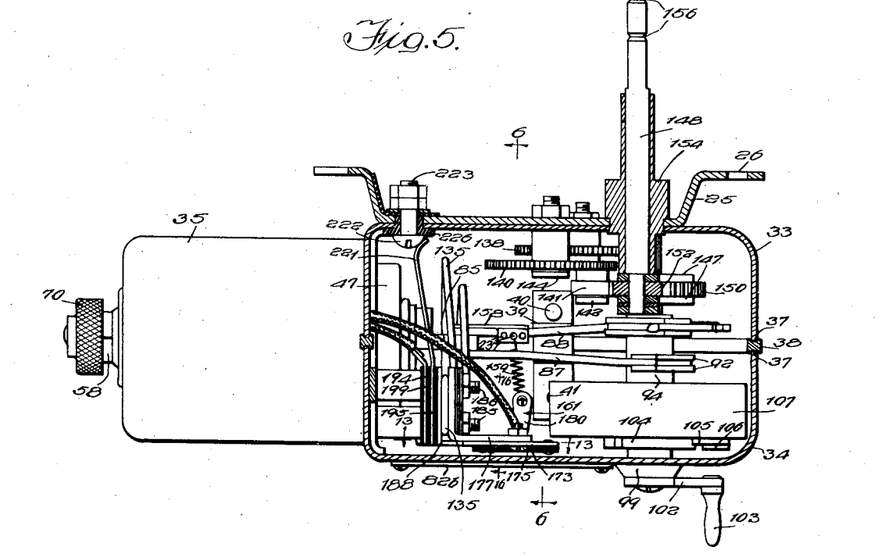
Fig. 5 is a section taken on line 5—5 of Fig. 1.
Figure 6:
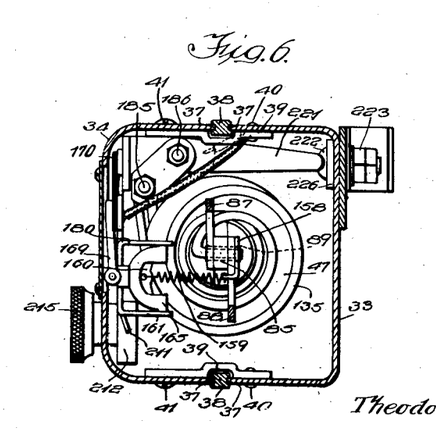
Fig. 6 is a section taken on line 6—6 of Fig. 5.
Figure 7:
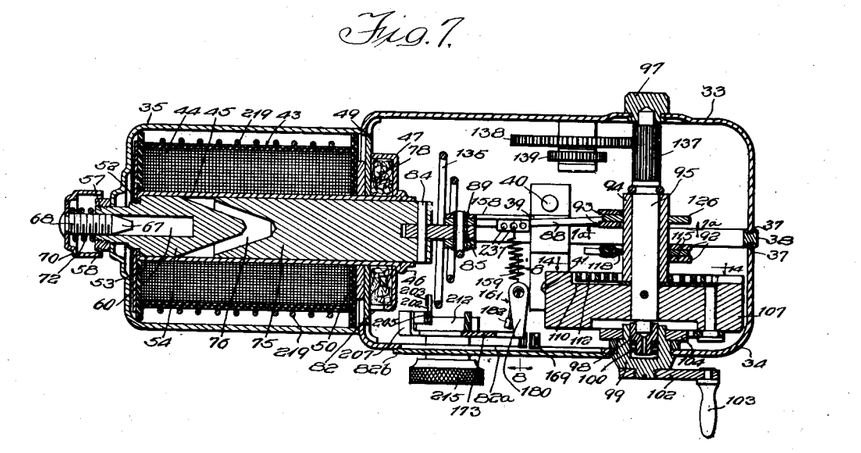
Fig. 7 is a section taken on line 7—7 of Fig. 1.

The housing 20 preferably comprises complementary housing members 33 and 34 and a cylindrical housing member 35. As best shown in Figs. 5, 6 and 7, the edges of the complementary housing members 33 and 34 are adapted to seat in grooves 37 provided in a gasket 38 which is preferably formed from lead, or the equivalent, the gasket being preferably H-shaped in cross section. Bars or plates 39 are preferably provided for securing the housing member 34 to the housing member 33, the bars or plates 39 being preferably secured to the housing member 33 by rivets 40, or the equivalent. The housing member 34 is removably secured to the plates or bars 39 by screws 41, or the equivalent. The cylindrical housing member 35 is preferably cup-shaped and its open end preferably rests against the ends of the housing members 33 and 34 (Fig. 4).

An electro-magnet shown, in the present instance, as a solenoid designated generally by the reference character 43 is disposed within the cylindrical housing member 35 and preferably comprises a winding 44 carried by a sleeve 45 which, in this instance, is concentrically disposed with respect to the cylindrical housing member 35. At its inner end, the sleeve 45 is provided with an outwardly extending annular bead 46 against which a relatively shallow cup-shaped member 47 abuts, the open end of the cup-shaped member 47 being closed by a plate 49 engaging the inner surface of the housing members 33 and 34. A washer 50 interposed between the solenoid 43 and the plate 49 spaces the solenoid from the plate. The outer end of the sleeve 45 is preferably provided with an inwardly extending annular flange 52 against which a shoulder 53 formed upon a pole piece 54 abuts and formed integral with the pole piece 54 is a tubular extension 57 which projects from the sleeve 45 and has a nut 58 screw-threaded upon its outer end. It is readily understood that the nut 58 may be manipulated to rigidly secure the cylindrical housing member 35 and the apparatus disposed therein to the housing members 33 and 34, the arrangement being such that the cup-shaped member 47, the plate 49, the solenoid 43, the pole piece 54 and the cylindrical housing member 35 may be loosely assembled so that the housing members 33 and 34 may be subsequently brought into positions wherein portions thereof may be clamped between the open end of the cylindrical housing member 35 and the plate 49. Obviously, the nut 58 may then be tightened to rigidly secure the housing members 33 and 34 to the cylindrical housing member 35. Of course, after the housing members 33 and 34 have been correctly positioned with respect to the cylindrical housing member 35 and the plate 49, the housing member 34 may be secured to the housing member 35 by means of the screws 41. If, at any later time, it becomes necessary to remove the housing member 34 to permit inspection or repair of the mechanism disposed within the housing, the nut 58 may be loosened slightly and then after the screws 41 have been withdrawn, the housing member 34 may be quickly and easily removed from the remainder of the apparatus.

Figure 4:
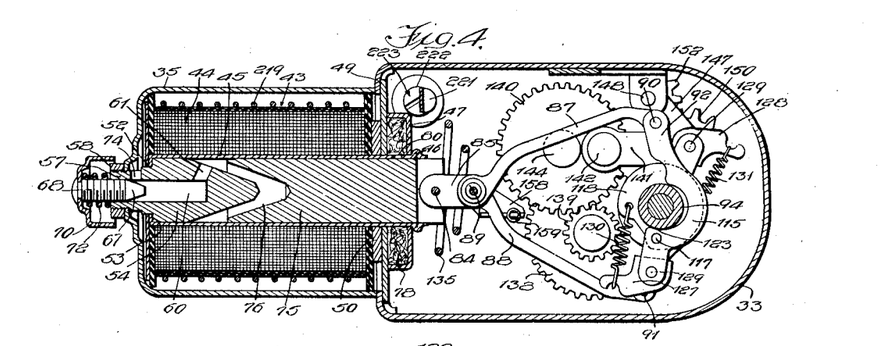
Fig. 4 is a section taken on line 4—4 of Fig. 2.

The inner end of the pole piece 54 is preferably tapered as best shown in Fig. 4, the tapered end being preferably provided with a substantially central bore 60 which communicates with the interior of the sleeve 45 through a port 61. A pin 68 having a tapered end 67 is preferably screw-threaded into the bore 60 and is provided with a cap or knurled member 70 rigidly secured to the outer end thereof. Interposed between the knurled member 70 and the outer end of the pole piece 54 is a compression spring 72 which tends to prevent accidental angular displacement of the pin 68. A port 74 formed in the pole piece 54 permits the bore 60 to communicate directly with the space within the cylindrical housing member 35, the construction being such that the cylindrical housing member 35 may hold a quantity of air between its inner surface and the solenoid 43. Referring now to Fig. 4, it will be noted that when the pin 68 does not close the port 74, air may pass from the interior of the sleeve 45 through the port 61, the bore 60 and the port 74 into the space between the solenoid 43 and the inner surface of the cylindrical member 35. In the illustrated embodiment of the invention, the plate 49 is so formed that air may pass freely from within the cylindrical housing member 35 to the space between the housing members 33 and 34. The purpose of this construction will presently appear.

Slidably journaled in the inner end of the sleeve 45 is a core 75 having a recess 76 in the inner end thereof, which recess 76 conforms to the shape of the tapered end of the pole piece 54. This construction resembles that shown in my copending application above referred to and adds to the efficiency of the solenoid.

Figures 1, 2:
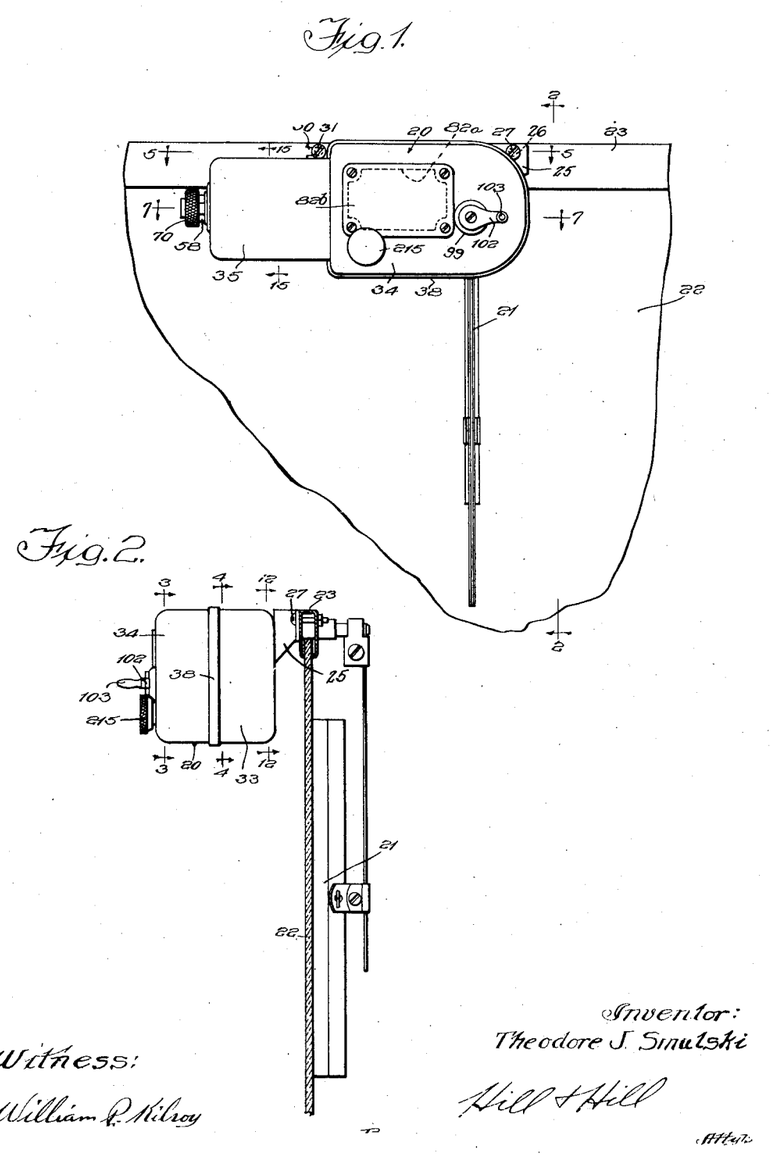
Fig. 1 is an elevation of a windshield cleaning device embodying the invention, the device being shown in connection with a windshield.
Fig. 2 is a section taken on line 2—2 of Fig. 1.

The aforementioned cup-shaped member 47 cooperates with the plate 49 and the sleeve 45 to form an annular chamber 78 in which I preferably place a quantity of fibrous material which has been saturated with any suitable lubricant. This lubricant may pass through one or more apertures 80 provided in the sleeve 45 to lubricate the inner surface of the sleeve so that the core 75 will slide freely therein. An aperture or oil hole 82 (Fig. 7) provided in the cup-shaped member 47 permits oil or any other suitable lubricant to be discharged into the fibrous material whenever the supply of lubricant must be replenished. To permit access to the oil hole 82, I preferably provide an aperture 82a (Figs. 1 and 7) in the housing member 34, which aperture 82a is normally closed by a removable name plate 82b, or the equivalent.

Pivoted to the outer end of the core 75 by a pin 84 is a link 85 which connects the core to a pair of levers 87 and 88, the levers 87 and 88 each having one of its ends pivoted by a sleeve or tubular rivet 89 to the link 85. The other ends of the levers 87 and 88 are pivoted by pins 90 and 91, respectively, to pawls or dogs 92 and 93, respectively, which frictionally engage a sleeve 94 rotatably journaled upon a shaft 95 which has one of its ends rotatably journaled in a bearing block 97 secured to the housing member 33, the other end of the shaft being rotatably journaled in a bearing member 98 slidably and rotatably journaled in a bearing block 99 rotatably journaled in the housing member 34. As best shown in Fig. 7, the bearing member 98 is urged toward the shaft 95 by a compression spring 100 interposed between the bearing member and the bearing block 99. Screw-threaded upon the outer end of the bearing block 99 is a lever 102 which is provided with a handle 103 whereby the shaft 95 may be rotated as will presently appear. It is readily understood that the lever 102 may be quickly and easily removed from the bearing block 99 so that when the apparatus is to be packed for shipping purposes, the lever and handle may be conveniently stored within the package or box. This permits a relatively small box to be used and also insures that the handle will not be broken during transit.

Constrained to rotate with the bearing block 99 is a ratchet 104 engageable with a pawl 105 pivoted by a pin 106 to a fly-wheel 107 which is rigidly secured to the shaft 95, the construction being such that when the bearing block 99 is rotated in a clockwise direction (Figs. 1 and 5) by means of the handle 103, the ratchet 104 will operatively engage the pawl 105 and cause the fly-wheel 107 to rotate in unison with the bearing member. Of course, this movement will be transmitted to the shaft 95 which will also rotate in unison with the bearing member 99.

Figure 7A:
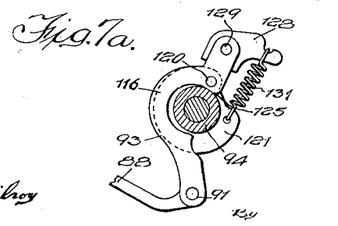
Fig. 7a is a section taken on line 7a—7a of Fig. 7.

As best shown in Fig. 7, the fly-wheel 107 is recessed as at 110 to accommodate a spiral spring 112 which has one of its ends secured to the fly-wheel 107 and has the other of its ends secured to the sleeve 94. As hereinbefore set forth, the sleeve 94 is engageable by pawls or dogs 92 and 93. The pawls or dogs 92 and 93 are substantially identical in construction and preferably comprise arcuate portions 115 and 116, respectively, which partly encircle the sleeve 94. The dogs 92 and 93 are provided in pairs in this instance, there being two dogs 92 and two dogs 93. The dogs 92 are pivoted intermediate their ends by a pin 117 to a collar 118 rotatably journaled upon the sleeve 94 and the dogs 93 are pivoted intermediate their ends by a pin 120 to a collar 121 also rotatably journaled upon the sleeve 94. The pawls 92 are provided with surfaces 123 disposed in relatively close proximity to the pin 117 and adapted to make effective frictional engagement with the sleeve 94 to rotate it, and, in a like manner, the dogs 93 are provided with surfaces 125 disposed in relatively close proximity to the pin 120 and also adapted to make effective frictional engagement with the sleeve 94 to rotate it (Fig. 7a). Rigidly secured to the pawls 92 is a plate 127 and rigidly secured to the dogs 93 is a plate 128, the plates 127 and 128 being secured to the dogs by pins 129. A tension spring 130 has one of its ends secured to the collar 118 and has the other of its ends secured to the plate 127, the construction being such that the spring 130 tends to angularly displace the dogs 92 in a clockwise direction (Fig. 4) around the pin 117. Interposed between the plate 128 and the collar 121 is a tension spring 131 which tends to angularly displace the dogs 93 in a clockwise direction (Fig. 4) around the pin 120.

Projecting through the aforementioned tubular rivet 89 is one end of a compression spring 135, the other end of which abuts against the cup-shaped plate 47 and yieldingly urges the core 75 to the right (Fig. 4), the arrangement being such that when the solenoid 43 is energized, the core 75 is retracted against the action of the spring 135. When the core 75 is thus retracted by the solenoid, the link 85 is, of course, longitudinally displaced to the left (Fig. 4) and the lever 88 causes the surfaces 125 to effectively engage the sleeve 94 in such manner that the sleeve is rotated in a clockwise direction (Fig. 4). Then when the core 75 has been displaced a predetermined distance toward the pole piece 54, mechanism hereinafter described causes an electrical circuit, which includes the winding of the solenoid, to be opened so that the spring 135 will longitudinally displace the core 75 to the right (Fig. 4). This movement of the core 75 is transmitted to the lever 87 so that the surfaces 123 formed on the dogs 92 effectively engage the sleeve 94 and rotate it in a clockwise direction (Fig. 4). It is readily understood that when the sleeve 94 is being rotated through the action of the solenoid 43, the surfaces 123 do not effectively engage the sleeve and when the sleeve 94 is being rotated through the action of the spring 135 the surfaces 125 do not effectively engage the sleeve.

Figure 12:
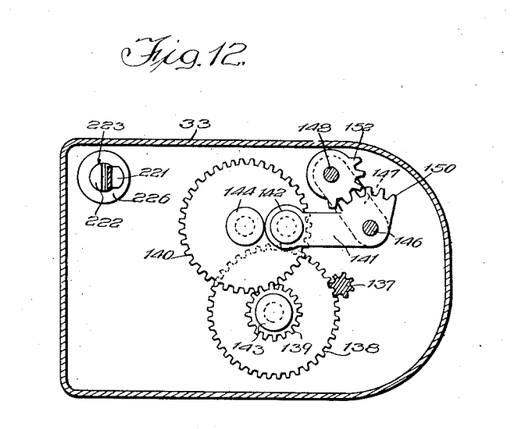
Fig. 12 is a section taken on line 12—12 of Fig. 2.

As best shown in Figs. 7 and 12, a pinion 137 is preferably formed integral with the shaft 95 and meshes with a gear 138 with which a pinion 139 is constrained to rotate. The pinion 139 meshes with a gear 140 to which one end of a link 141 is pivoted by a pin 142, the pin 142 being eccentrically disposed with respect to the axis of rotation of the gear 140. The gear 138 and the pinion 139 are rotatably journaled upon a stud shaft 143 secured to the housing member 33 and the gear 140 is rotatably journaled upon a stud shaft 144 rigidly secured to the same housing member. The link 141 is pivotally connected by a pin 146 to levers 147 which are pivoted upon a shaft 148. A gear segment 150 formed integral with the link 141 and concentrically disposed with respect to the longitudinal axis of the pin 146 meshes with a gear segment 152 rigidly secured to the shaft 148. The construction is such that when the gear 140 is rotated, the link 141 will oscillate the levers 147 through a predetermined angle and the gear segment 150 will cause the gear segment 152 to oscillate the shaft 148 through a larger angle. The aforementioned squeegee 21 is preferably adjustably secured to the outer end of the shaft 148 and the shaft 148 is preferably journaled in an elongated bearing member 154 rigidly secured to the housing member 33. As shown, the shaft 148 may extend a relatively long distance beyond the outer end of the bearing member 154 and may be provided with circumferential grooves 156 which permit sections of the shaft to be quickly and easily removed therefrom. Thus, if the construction of the automobile upon which the squeegee is mounted is such that a relatively long shaft 148 is required, the squeegee 21 may be secured to the outer end of the shaft, but if the construction of the automobile is otherwise, sections of the shaft may be removed therefrom so that after the cleaning apparatus has been properly assembled upon the automobile, the shaft 148 will not project any appreciable distance beyond the squeegee.

Figure 8:
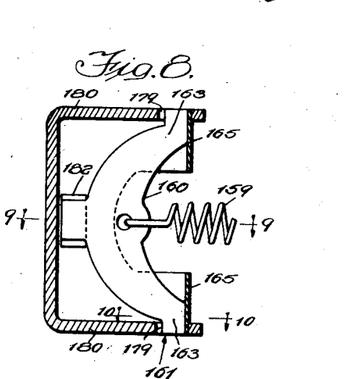
Fig. 8 is a section taken on line 8—8 of Fig. 7.

Referring now to Fig. 7, it will be noted that a bracket 158 is secured to the link 85 by the aforementioned sleeve or tubular rivet 89. A tension spring 159 has one of its ends secured to the bracket 158 and has the other of its ends secured to an actuating member 160 constituting part of an electrical switch device which is designated generally by the reference character 161. As shown in Fig. 8, the actuating member 160 is in the form of a bifurcated plate, the bifurcations being identified by the reference character 163. The spring 159 holds the bifurcations 163 in engagement with arcuate bearing portions 165 preferably formed integral with a U-shaped switch member 166 (Fig. 9) carrying a contact point 167 which is engageable with a contact point 168 carried by a bracket member 169. It will be noted that the actuating member 160 is pivotally mounted by its bifurcations 163. The bracket member 169 is preferably secured to a plate 170 (Fig. 6) formed from any suitable electrical insulation, the plate being secured by screws 171 (Fig. 3), or the equivalent, to a bracket 173 which is pivoted by a screw 175, or the equivalent, to a bracket 177 supported by parts hereinafter described (see Figs. 13, 16 and 17).

Figure 9:
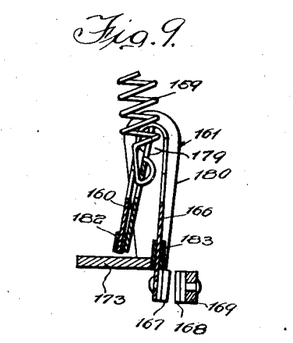
Fig. 9 is a section taken on line 9—9 of Fig. 8.
Figure 10:
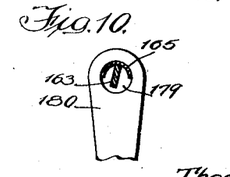
Fig. 10 is a section taken on line 10—10 of Fig. 8.
Figure 11:
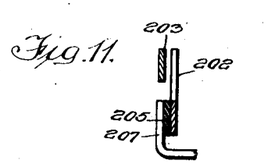
Fig. 11 is a section taken on line 11—11 of Fig. 3.

As best shown in Figs. 8 and 9, the arcuate bearing portions 165 are substantially semi-circular in form and rotatably journal the switch member 166 in the apertures 179 provided in arms 180 preferably formed integral with the bracket 173, the construction being such that the switch member 166 may be angularly displaced from a position wherein its contact point 167 engages the contact point 168 into a position wherein the contact point 167 is disengaged from the contact point 168. Sleeves 182 and 183 of resilient material such as rubber, or the like, are preferably provided upon the switch member 166, the sleeve 182 being adapted to engage the actuating member 160 and the sleeve 183 being adapted to engage the bracket 173 which functions as a stop when it is engaged by the sleeve 183.

Figure 3:
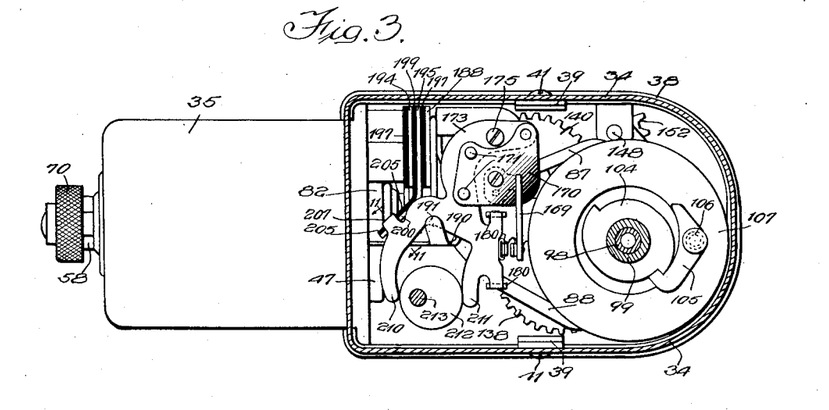
Fig. 3 is a section taken on line 3—3 of Fig. 2.
Figure 16:
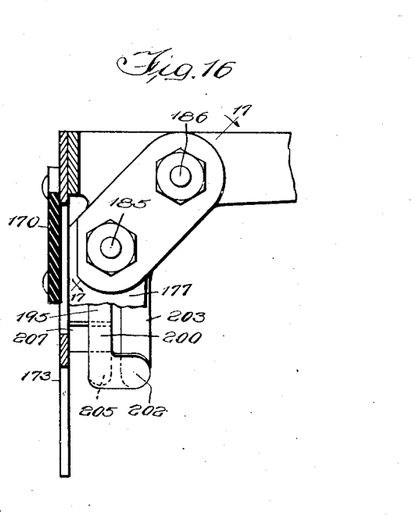
Fig. 16 is a fragmentary section taken on line 16—16 of Fig. 5.
Figure 17:
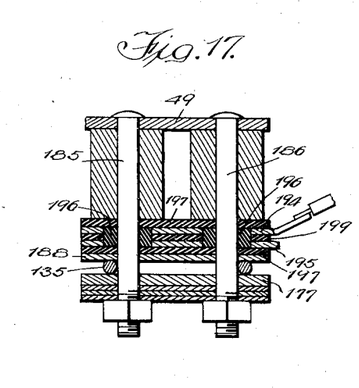
Fig. 17 is a section taken on line 17—17 of Fig. 16.

The aforementioned bracket 177 is rigidly secured to the plate 49 by bolts 185 and 186, or the equivalent, which clamp one end of the spring 135 between the bracket 177 and a metallic plate 188 also carried by the bolts. As shown in Fig. 3, the bracket 177 has an arm 190 formed integral therewith, which arm is provided with an integral lug 191. The lug 191 and the arm 190 cooperate to guide the bracket 173 when it is angularly displaced around the screw 175. Metallic plates 194 and 195 carried by the bolts 185 and 186 (see Fig. 17) are electrically insulated from the bolts and the other parts carried thereby, sleeves 196 and plates 197 of electrical insulation being provided for this purpose. The metallic plates 194 and 195 are electrically insulated from each other by a plate 199 of electrical insulation. As best shown in Fig. 16, the plate 195 has a downwardly projecting arm 200 provided with a lug 202 engageable by an arm 203 which projects downwardly from the plate 194, the construction being such that the lug 202 engages the arm 203 whenever the windshield cleaning apparatus is in operation. Projecting downwardly from the bar 199 and formed integral therewith is an arm 205 (see Figs. 3 and 16) which rests against the arm 200 and is engageable by a lug 207 preferably formed integral with the bracket 173. It is, of course, understood that the arms 200 and 203 are somewhat resilient and that the arm 200 may be bent into a position wherein its lug 202 will not engage the arm 203. The arrangement is such that if the bracket 173 is angularly displaced around the screw 175 in a manner hereinafter described, the lug 207 bearing against the arm 205 will bend the arm 200 into a position wherein its lug 202 is disengaged from the arm 203.

Figures 13, 14:
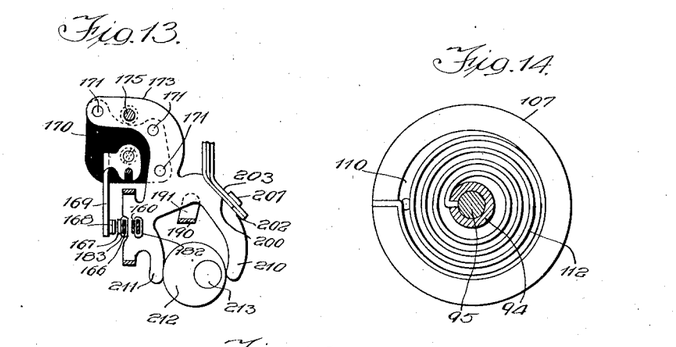
Fig. 13 is a section taken on line 13—13 of Fig. 5.
Fig. 14 is a section taken on line 14—14 of Fig. 7.
Figure 15:
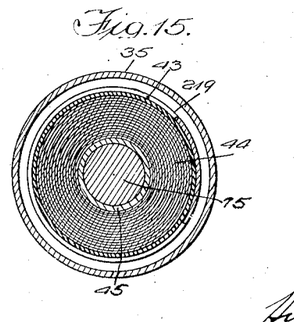
Fig. 15 is a section taken on line 15—15 of Fig. 1.

Referring now to Fig. 13, it will be noted that the bracket 173 is provided with bifurcations 210 and 211 engageable with a cylindrical member 212 rigidly secured to a pin 213 which is rotatably journaled in the housing member 34, the outer end of the pin 213 being provided with a knurled knob 215 whereby the pin may be angularly displaced to angularly displace the cylindrical member 212. The member 212 is eccentrically mounted with respect to the axis of rotation of the pin 213 and it is readily understood that if the pin 213 is angularly displaced, the member 212 will angularly displace the bracket 173 around the screw 175. To facilitate the disclosure of this invention, the member 212 has been shown in a position wherein it has displaced the bracket 173 in such manner that the lug 207 formed integral with the bracket has disengaged the lug 202 from the arm 203. Obviously, if the pin 213 is rotated in either direction, the member 212 will bring the bracket 173 into a position wherein the lug 207 permits the lug 202 to engage the arm 203.

Figure 18:
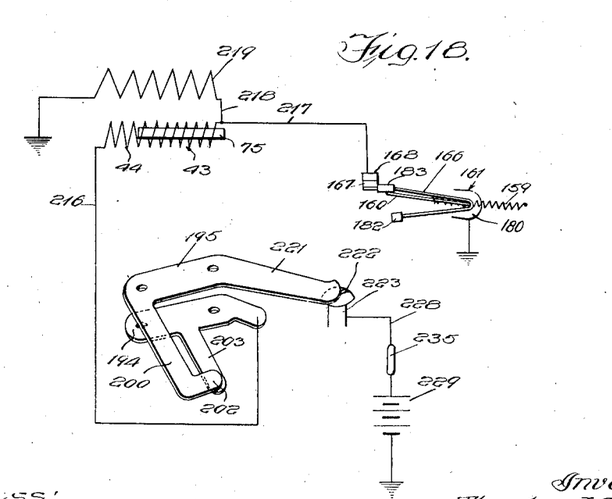
Fig. 18 is a diagram of an electrical circuit which constitutes part of my improved windshield cleaning device.

As diagrammatically illustrated in Fig. 18, the metallic plates 194 and 195 form part of an electrical circuit which controls the operation of the windshield cleaning apparatus. As shown, the winding 44 of the solenoid 43 has one of its terminals connected by a conductor 216 to the plate 194, the other terminal of the winding 44 being connected by conductors 217 and 218 to the contact point 168 and a resistance 219, respectively. The conductor 218 is connected to one terminal of the resistance 219, the other terminal of the resistance being preferably grounded to the chassis of the automobile. The resistance 219 preferably comprises a wire wound around the winding 44 (see Fig. 4). The metallic plate 195 is provided with an integral spring member 221 (see Figs. 5 and 18) which is engageable with a head 222 of a bolt 223, or the equivalent, employed to secure the bracket 25 to the housing member 33, the bolt 223 being electrically insulated from the bracket 25 and the housing member 33 by electrical insulation indicated at 226 (Fig. 5). It may be mentioned at this point in the description that the bearing member 154 cooperates with the bolt 223 to rigidly secure the bracket member 25 to the housing member 33.

The bolt 223 serves as a binding post whereby the windshield cleaning apparatus may be connected by an electrical conductor 228 to one terminal of a storage battery 229, or the equivalent, which has its other terminal grounded upon the chassis of the automobile. The contact point 167 which is engageable with the contact point 168 is electrically connected to the bracket 173 through the switch member 166 and the arms 180 formed integral with the bracket. The bracket 173 is grounded to the chassis of the automobile.

Assuming that the lug 202 engages the arm 203 and that the contact point 168 is engaged by the contact point 167, an electrical current will flow as follows: from the battery 229, through the conductor 228, the bolt 223, the plate 195, the plate 194, the conductor 216, the winding 44, the conductor 217, the contact points 168 and 167, the switch member 166 and through the bracket 173 and its arms 180 to ground and thence back to the battery 229. No appreciable current will flow through the resistance 219 at this time as substantially all of the current will flow through the path of least resistance which is through the plates 194 and 195, the winding 44 and the contacts 167 and 168. When the winding 44 is energized it displaces the core 75 to the left (Fig. 4) against the action of the spring 135 and causes the dogs 93 to angularly displace the sleeve 94 in a clockwise direction (Fig. 4). Such displacement of the core 75 draws the spring 159 into a position wherein it ceases to hold the actuating member 160 in the position wherein it causes the switch member 166 to hold the contact point 167 in engagement with the contact point 168, the actuating member being angularly displaced in a clockwise direction (Fig. 9) to bring the switch member 166 into the position wherein it is shown in Fig. 9. Of course, when the switch member 166 occupies the position wherein it is shown in Fig. 9, the contact point 167 is disengaged from the contact point 168 and the winding 44 is de-energized. This permits the spring 135 to displace the core 75 to the right (Fig. 4) so that the dogs 92 effectively engage the sleeve 94 and angularly displace it in a clockwise direction (Fig. 4). However, such movement of the core 75 to the right (Fig. 4) will swing the spring 159 into the position wherein it will again cause the switch member 166 to bring its contact point 167 into engagement with the contact point 168 and the winding 44 will be energized so that the core 75 will be displaced to the left (Fig. 4). This sequence of operations is continued until the circuit shown in Fig. 18 is opened at some point other than between the contacts 167 and 168. Thus, the knob 215 may be manipulated to rotate the cylindrical member 212 into a position wherein it causes the lug 207 to disengage the lug 202 from the arm 203. If desired, a switch 235 may be inserted in the conductor 228 or in any other suitable place in the circuit so that the circuit may be opened at any time without manipulation of the knob 215.

It is, of course, understood that the resistance 219 tends to prevent arcing between the contact points 167 and 168 when the contact point 167 is disengaged from the contact point 168. In the preferred embodiment of the invention, the resistance 219 is preferably disposed around the winding 44 so as to simplify the construction, it being unnecessary to provide any additional means for mounting the resistance. This improved construction also permits one terminal of the resistance 219 to be easily connected to one terminal of the winding 44 and therefore obviates the necessity of providing a relatively long conductor 218 in the circuit. In fact, the conductor 218 shown in Fig. 18 is generally not employed, one terminal of the resistance 219 being soldered directly to one terminal of the winding 44.

The operation of the above described apparatus is substantially as follows: Assuming that the switch 235 is in its open position or that the lug 202 is disengaged from the arm 203, the spring 135 will cause the spring 159 to assume a position wherein it holds the contact point 167 of the switch member 166 in engagement with the contact point 168. Now, if the circuit shown in Fig. 18 is closed by closing the switch 235 or by bringing the lug 202 into engagement with the arm 203, the winding 44 will be energized in the manner described above and the core 75 will be displaced toward the pole piece 54 against the action of the spring 135. Such displacement of the core will cause the surfaces 125 provided upon the dogs 93 to effectively engage the sleeve 94 and to rotate it in a clockwise direction (Fig. 4). The rotation of the sleeve 94 will be imparted to the fly-wheel 107 through the spiral spring 112 and the fly-wheel 107 will in turn rotate the shaft 95 in a clockwise direction. The angle through which the shaft 95 is rotated will be determined or controlled by the distance through which the core 75 is displaced but when the core 75 nears the end of its stroke toward the pole piece 54, the spring 159 will be brought into a position wherein it causes the actuating member 160 to snap into the position wherein it holds the contact point 167 disengaged from the contact point 168. This de-energizes the solenoid 43 and permits the spring 135 to displace the core 75 to the right (Fig. 4) so that the surfaces 123 provided upon the dogs 92 will rotate the sleeve 94 in a clockwise direction (Fig. 4). The rotary movement of the sleeve 94 is, of course, imparted to the shaft 95 through the fly-wheel 107 and the spring 112. When the core 75 nears the end of its stroke away from the pole piece 54, the spring 159 is again displaced to bring the contact point 167 into engagement with the contact point 168 so that the winding 44 will again attract the core and the dogs 93 will again rotate the sleeve 94 in a clockwise direction (Fig. 4) until the spring 159 again functions to bring the contact point 167 out of engagement with the contact point 168. This sequence of operations is continued until the switch 235 is opened or until the lug 202 is disengaged from the arm 203. However, the arrangement is such that while the lug 202 engages the arm 203 and the switch 235 is in its closed position, the shaft 95 is rotated substantially continuously in a clockwise direction (Fig. 4) and, as explained above, this rotary motion of the shaft 95 is translated into the oscillatory motion which is imparted to the squeegee 21.

The speed at which the mechanism operates is controlled by the position in which the spring 159 is secured to the reciprocating mechanism that comprises the core 75, and also by the knurled knobs 70 and 215. Thus, the bracket 158 shown in the drawings may be provided with a plurality of apertures 237 for securing the one end of the spring 159 thereto. Obviously, if the spring is secured to the bracket 158 by hooking one of its ends in an aperture 237 disposed closer to the core 75 than the aperture 237 so employed in the drawings, the stroke of the core 75 will be shorter and the apparatus will operate at a lower speed. And also, if one end of the spring 159 is hooked into the aperture 237 disposed at the greatest distance from the core 75, the stroke of the core will be longer and the apparatus will operate at a higher speed. Of course, such adjustments of the spring 159 are preferably made by the manufacturer of the apparatus.

When the knob 215 is rotated, the bracket 173 is angularly displaced around the screw 175 to move the contacts 167 and 168 to the right or left (Fig. 3). If these contacts are moved to the left (Fig. 3), the core will make longer strokes and the squeegee will operate at a higher rate of speed, but if the contacts are moved to the right (Fig. 3) the core will make shorter strokes and the squeegee will operate at a lower rate of speed.

It is also readily understood that if the knob 70 is manipulated to have the pin 68 close the port 74, air within the sleeve 45 will not be discharged through the port 74 when the core 75 is longitudinally displaced toward the left (Fig. 4). This air will serve as a cushion and retard movement of the core 75 and cause the apparatus to operate at a relatively low speed. Now, if the knurled knob 70 is manipulated to permit air to pass into and out of the sleeve 45 by way of the port 74 and the port 60, the apparatus will operate at a higher speed, the rate of speed being determined by the extent to which the port 74 is uncovered. Obviously, the operator can quickly and easily regulate the operation of the apparatus by manipulating the knob 70.

The construction of the switch mechanism which comprises the actuating member 160 and the switch member 166 is an important feature of my invention as it enables the solenoid 43 and the spring 135 to cooperate in such manner that the core 75 will make well defined strokes instead of simply vibrating at a relatively high speed. It will be noted that my switch construction departs from the usual practice in that the spring 159 is secured to the actuating member 160 instead of to the switch member 166. This arrangement permits a slight lag in the operation of the switch as the spring 159 first angularly displaces the actuating member and this displacement of the actuating member serves to angularly displace the switch member. The lag in the operation of the switch mechanism is, of course, a factor which controls the stroke of the core and the switch mechanism is preferably so designed that no matter how the other controls are manipulated, the stroke of the core will always be of sufficient length to insure effective rotation of the sleeve 94 by the dogs 92 and 93. The actuating member 160 may be termed a hammer or impact member as it is moving relatively rapidly when it is being displaced by the spring 159 and therefore, strikes the switch member 166 with sufficient force to bring the contact point 167 quickly into and out of engagement with the contact point 168. This, like the resistance 219, prevents arcing between the contact points.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a windshield cleaner actuating mechanism, a solenoid having a reciprocatory core adapted to oscillate a squeegee, means for intermittently energizing said solenoid, said means comprising a switch having a plurality of cooperating contacts, and means for bodily displacing said contacts as a unit and for adjustably positioning the contacts relative to each other to regulate the movement of the core.

2. In a reciprocating motor adapted to oscillate a squeegee, a solenoid comprising a winding and a core therein, and means for causing said core to reciprocate comprising a switch, said switch being operatively connected to said core and adjustable with respect thereto for varying the reciprocating movement of the core.

3. In a reciprocating motor adapted to oscillate a squeegee, a solenoid comprising a winding and a reciprocating core therein, a switch member for energizing said winding, and resilient means connected to said core and to said switch member for operating the switch to deenergize the winding at the end of a stroke of said core, and means for adjusting the position of said switch member in a manner to vary the instant in the travel of said core at which said resilient means acts to operate said switch.

4. In a reciprocating motor adapted to oscillate a squeegee, a solenoid having a reciprocating core, means for intermittently energizing said solenoid comprising a switch having a pair of contacts controlled by said solenoid, means for actuating said switch, and means for adjusting said switch to control the movement of said core, said adjustment comprising means for moving both of the contacts of said switch as a unit.

5. In a reciprocating motor adapted to oscillate a squeegee, a solenoid having a reciprocating core, and means for intermittently energizing said solenoid, said means comprising an electric circuit, a plurality of contacts in said circuit, pivoted means for controlling the relative position of said contacts, a switch in said circuit mounted on said pivoted means, operating means connected to said core for actuating said switch, and means for adjusting the position of said pivoted means in a manner to vary the relative position of said switch and solenoid for determining the length of stroke of said core.

6. In a reciprocating motor adapted to oscillate a squeegee, a solenoid having a reciprocating core, and means for intermittently energizing said solenoid, said means comprising an electric circuit, a plurality of contacts in said circuit, a bracket having means thereon for controlling the relative position of said contacts, a switch in said circuit carried by said bracket, resilient means connected to said core and switch for actuating the switch, and rotatable means for adjusting the position of said bracket for controlling the relative position of said contacts and in a manner to vary the relative position of said switch and solenoid for determining the length of stroke of said core.

7. In a windshield cleaner actuating mechanism, an electro-magnet, an armature associated therewith adapted to oscillate a squeegee, means for intermittently energizing said magnet, said means comprising a switch having a plurality of cooperating contacts, means for bodily displacing said contacts as a unit with respect to said magnet and armature, and means for adjustably positioning the contacts relative to each other for regulating the movement of said armature.

In testimony whereof, I have hereunto signed my name.

THEODORE J. SMULSKI.